United States Patent
Kusukawa et al.

[19]

[11] Patent Number: 5,941,136
[45] Date of Patent: Aug. 24, 1999

[54] CASE STRUCTURE OF DRIVING POWER TRANSFER APPARATUS

[75] Inventors: Hirotaka Kusukawa, Tokyo; Yukikazu Hirai, Yokohama, both of Japan

[73] Assignee: NISSAN Motor Co., Ltd., Yokohama, Japan

[21] Appl. No.: 08/958,671

[22] Filed: Oct. 27, 1997

[30] Foreign Application Priority Data

Nov. 1, 1996 [JP] Japan .................................. 8-291790

[51] Int. Cl.⁶ .................................................. F16H 57/02
[52] U.S. Cl. ........................................ 74/606 R; 180/53.6
[58] Field of Search ............................... 74/606 R, 15.86, 74/15.88, 15.8; 180/53.6, 53.7, 53.8

[56] References Cited

U.S. PATENT DOCUMENTS

| | | | |
|---|---|---|---|
| 3,952,606 | 4/1976 | Schulz | 74/377 |
| 4,231,622 | 11/1980 | Paullin | 308/22 |
| 4,279,178 | 7/1981 | Todd | 74/745 |
| 4,604,908 | 8/1986 | Dolan | 74/15.88 |
| 4,813,290 | 3/1989 | Hone | 74/15.88 |
| 5,022,478 | 6/1991 | Hartmann | 180/53.1 |
| 5,289,730 | 3/1994 | Wilson et al. | 74/15.88 |
| 5,311,787 | 5/1994 | Wilson et al. | 74/15.88 |

FOREIGN PATENT DOCUMENTS 62-275841  11/1987  Japan .

*Primary Examiner*—Vinh T. Luong
*Attorney, Agent, or Firm*—Foley & Lardner

[57] ABSTRACT

A transfer case of a driving power transfer apparatus is connected to a transverse engine through a transmission in an automotive vehicle. The transfer case has a case body which includes a cylindrical portion, an opening portion connected to an end of the cylindrical portion and a bolt connecting portion formed around the opening portion. The opening portion is connected to the cylindrical portion in offset connection such that a part of the bolt connecting portion is overlapped with the cylindrical portion as viewed from the axis of the opening portion. An adapter is connected to the bolt connecting portion by means of bolts and has a cylindrical engaged portion which is sealingly engaged with the first opening portion of the case body. Therefore, a clearance between the transfer case and the engine is sufficiently ensured to improve the degree of freedom in the layout of the engine.

11 Claims, 5 Drawing Sheets

CASE STRUCTURE OF DRIVING POWER TRANSFER APPARATUS

BACKGROUND OF THE INVENTION

The present invention relates to improvements in a driving power transfer apparatus for a vehicle, and more particularly to a case structure for covering parts of a driving power transfer apparatus.

Japanese Patent Provisional Publication No. 62-275841 discloses a conventional driving power transfer apparatus which is installed in a four wheel drive vehicle equipped with a transverse engine. The driving power transfer apparatus includes a transmission connected to an end side of the engine and a transfer connected to the transmission generally in parallel. The transfer has a center differential, a front differential, a direction changing mechanism and a viscous coupling. A housing of the transfer is constituted by first and second cases. The first case has a large opening so that the ring gear is easily installed in the housing. A flange portion is formed around a peripheral portion defining the large opening of the first case. The flange portion projects outwardly and is connected with a flange portion of the second case by means of bolts. However, since the transfer is located in the vicinity of the engine and has the projecting flange portions, a clearance between the transfer and the engine is small. This limits the arrangement of the engine in an engine compartment of an automotive vehicle.

Further, when the driving torque from the engine is transferred to the direction changing mechanism through the center differential and the front differential, a drive pinion gear of the direction changing mechanism applies a reaction force to the ring gear of the front differential so as to push the ring gear in the lateral direction of the vehicle. The lateral directional reaction force functions so as to increase the clearance between the first and second flange portions. This may degrade the sealing performance of the transfer.

SUMMARY OF THE INVENTION

It is an object of the present invention to provide an improved transfer case of a driving power transfer apparatus which case improves oil seal performance thereof and ensures a space between the driving power transfer apparatus and an engine.

An aspect of the present invention resides in a transfer case for a driving power transfer apparatus which is connected to an engine through a transmission in an automotive vehicle. The transfer case comprises a case body, an adapter and a side case. The case body is formed into a cylindrical shape and has an opening. A gear is inserted through the opening in the case body. The opening has a first radius which is greater than a maximum radius of the gear. A bolt connecting portion is formed around the opening such that a part thereof located at a front part to be faced with the engine is located nearer to an axis of the opening than a cylindrical shaped wall portion around the gear. The adapter is connected to the bolt connecting portion by means of bolts. The adapter has a cylindrical engaged portion which is sealingly engaged with a wall defining the first opening of the case body. The side case is connected to the bolt connecting portion through the adapter by means of the bolts.

Another aspect of the present invention resides in a transfer case of a driving power transfer apparatus of an automotive vehicle. The driving power transfer apparatus is connected to an engine through a transmission. The transfer case comprises a case body and an adapter. The case body includes a cylindrical portion, an opening portion connected to an end of the cylindrical portion and a bolt connecting portion formed around the opening portion. The opening portion is connected to the cylindrical portion in offset connection such that a part of the bolt connecting portion is overlapped with the cylindrical portion as viewed from the axis of the opening portion. The adapter is connected to the bolt connecting portion by means of bolts. The adapter has a cylindrical engaged portion which is sealingly engaged with the first opening portion of said case body.

DETAILED DESCRIPTION OF THE INVENTION

Figure 1:
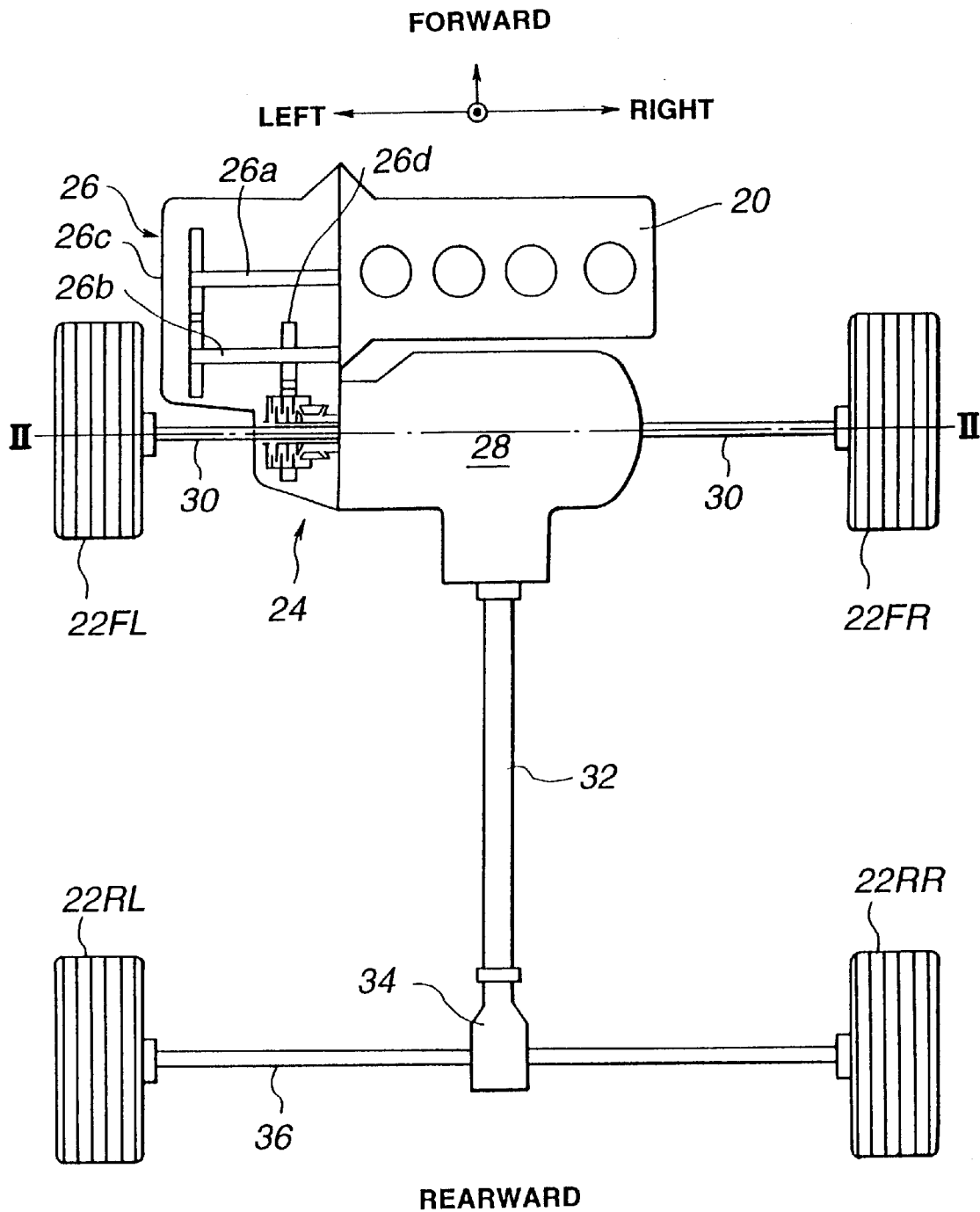
FIG. 1 is a schematic view of a four wheel drive vehicle in which a transversely arranged engine and a driving power transfer apparatus according to the present invention are provided.

Referring to FIGS. 1 to 6, there is shown an embodiment of a power transfer system for an automotive vehicle according to the present invention. As shown in FIG. 1, a transverse engine 20 is disposed at a front portion of the vehicle. The engine 20 is connected with a power transfer system 24 through which drive power of the engine 20 is transferred to four wheels 22FL, 22FR, 22RL and 22RR.

The power transfer system 24 comprises a main transmission 26 which transmits the drive force of the engine 20 at one of predetermined speed ratios, and a transfer apparatus 28 which splits the driving force outputted from the main transmission 26 into a front wheel driving torque and a rear wheel driving torque. The front wheel driving torque is transferred to the front wheels 22FL and 22FR through a front wheel drive shaft 30, as a driving force. The rear wheel driving torque is transferred to the rear wheels 22RL and 22RR through a propeller shaft 32, a rear differential 34 and a rear wheel drive shaft 36, as a driving force.

The main transmission 26 has an input shaft 26a which is coaxially connected with a laterally extending crankshaft of the engine 20 and an output shaft 26b which is disposed rearward of the input shaft 26a in parallel. The input and output shafts 26a and 26b are installed in a transmission case 26c. An output gear 26d is coaxially connected with the output shaft 26b and is engaged with an input gear 42b of a driving power transfer apparatus 28.

Figure 2:
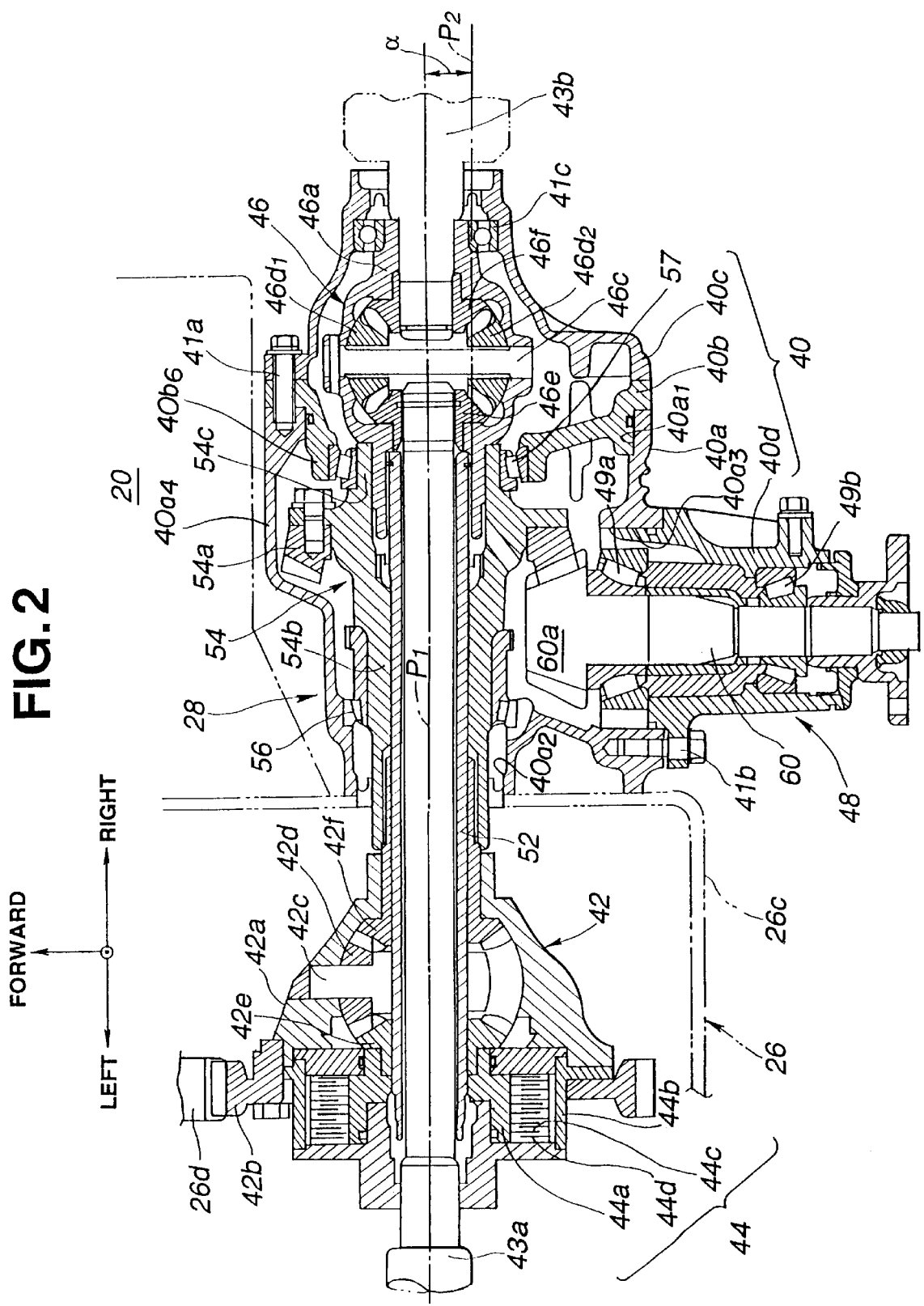
FIG. 2 is a cross sectional view taken on line II—II in FIG. 1 which shows an inner structure of the driving force transfer apparatus of the vehicle according to the present invention

The driving power transfer apparatus 28 is located at a rearward portion with respect to the main transmission 26 and in the vicinity of the engine 20, as shown in FIG. 1. The driving power transfer apparatus 28 is connected with the main transmission 26. As shown in FIG. 2, the driving power transfer apparatus 28 comprises a transfer case 40 which is integrally connected with a transmission case 26c of the main transmission 26. A center differential 42 is disposed in the transmission case 26c and receives the driving force from the output shaft 26b through the output gear 26d. A viscous coupling 44 is disposed parallel with the center differential 42 and receives the driving force from the output shaft 26b through the output gear 26d. A front differential 46 is disposed in the transfer case 40 and transfers the front wheel driving force from at least one of the center differential 42 and the viscous coupling 44 to the front wheels 22FL and 22FR. A rear wheel transfer mechanism 48 is disposed in the transfer case 40 and transfers the rear wheel driving force from the center differential 42 to the rear wheels 22RL and 22RR.

The transfer case 40 comprises a case body 40a integrally connected with the transmission case 26c, an adapter 40b engaged with a first opening $40a_1$, of the case body 40a, a side case 40c integrally connected with the case body 40a through the adapter 40b by means of connecting bolts 41a, and a rear case 40d integrally connected with a third hole portion $40a_3$ of the case body 40a by means of connecting bolts 41b. A second driving power transfer gear 60 is disposed in the rear case $40d_3$. The inside space of the transfer case 40 includes driving parts and is filled with lubricant.

A left side gear shaft 43a and a right side gear shaft 43b are engaged with the front differential 46 and are disposed in the transfer case 40. As shown in FIG. 2, the left side gear shaft 43a is formed to be longer than the right side gear shaft 43b. The left side gear shaft 43a is inserted into the transmission case 26c and is connected with the front wheel drive shaft 30. A hollow shaft 52 is rotatably installed around the left side gear shaft 43a. The center differential 42 is disposed around the hollow shaft 52.

The center differential 42 has a differential case 42a which is coaxially and rotatably disposed around the hollow shaft 52. The input gear 42b of the center differential 42 is integrally connected with the differential case 42a and is engaged with the output gear 26d of the output shaft 26b. A pinion shaft 42c is installed in the differential case 42a. The pinion shaft 42c is perpendicular to the hollow shaft 52. A pinion 42d is installed on the pinion shaft 42c and is engaged with a left side gear 42e and a right side gear 42f connected to an outer periphery of the hollow shaft 52.

The left side gear 42e is splined to the outer periphery of the hollow shaft 52. The right side gear 42f has a cylindrical portion extending into the case body 40 around the hollow shaft 52. The cylindrical portion of the right side gear 42f is splined to a small cylindrical portion 54b of a first driving force transfer gear 54 constituting the rear wheel transfer mechanism 48.

The first driving force transfer gear 54 comprises a hypoid gear 54a, the small cylindrical portion 54b integral with the hypoid gear 54a, and a large cylindrical portion 54c integral with the hypoid gear 54a. A teeth surface of the hypoid gear 54a is inclined toward the left hand side in the lateral direction as shown in FIG. 2. The first driving force transfer gear 54 is rotatablly disposed around the hollow shaft 52. A first bearing 56 is disposed between an inner surface of the case body 40a and an outer surface of the small cylindrical portion 54b. A second bearing 57 is disposed between an inner supporting portion $40b_6$ of the adapter 40b and the outer cylindrical portion 54c. Therefore, the first driving power transfer gear 54 is arranged to rotate around the hollow shaft 52 while being supported by the first and second bearings 56 and 57.

The viscous coupling 44 is an apparatus for generating limited torque by utilizing viscosity resistance of silicon oil. The viscous coupling 44 comprises an inner sleeve 44a splined to an outer periphery of the hollow shaft 52, an outer sleeve 44a disposed around the inner sleeve 44b, a plurality of inner plates 44c, and a plurality of outer plates 44d. The inner and outer plates 44c and 44d are alternatively arranged in a space between the inner sleeve 44a and the outer sleeve 44b.

A left side cylindrical portion of the differential case 46a of the front differential 46 is splined to the outer periphery of the hollow shaft 52. A right side cylindrical portion of the differential case 46a is supported to a third bearing 41c installed at an inner surface of the side case 40 so as to be rotatable in the transfer case 40. An end portion of the left side gear shaft 43a and an end portion of the right side gear shaft 43b are inserted into the differential case 46a. In the differential case 46a, a pinion shaft 46c perpendicular to the left side gear shaft 43a and the right side gear shaft 43b is installed. A pair of pinions $46d_1$ and $46d_2$ are connected to the pinion shaft 46c and are engaged with a left side gear 43e splined to the left side gear shaft 43a and a right side gear 43f splined to the right side gear shaft 43b.

The rear wheel transfer mechanism 48 is constituted by the first driving power transfer gear 54 and a second driving power transfer gear 60 which is rotatably supported with fourth and fifth bearings 49a and 49b disposed in a rear side case 40d. An end portion of the second driving power transfer gear 60 is connected with a hypoid gear 60a engaged with the hypoid gear 54a of the first driving power transfer gear 54. The other end portion of the second driving power transfer gear 60 is connected with the propeller shaft 32.

Figure 3:
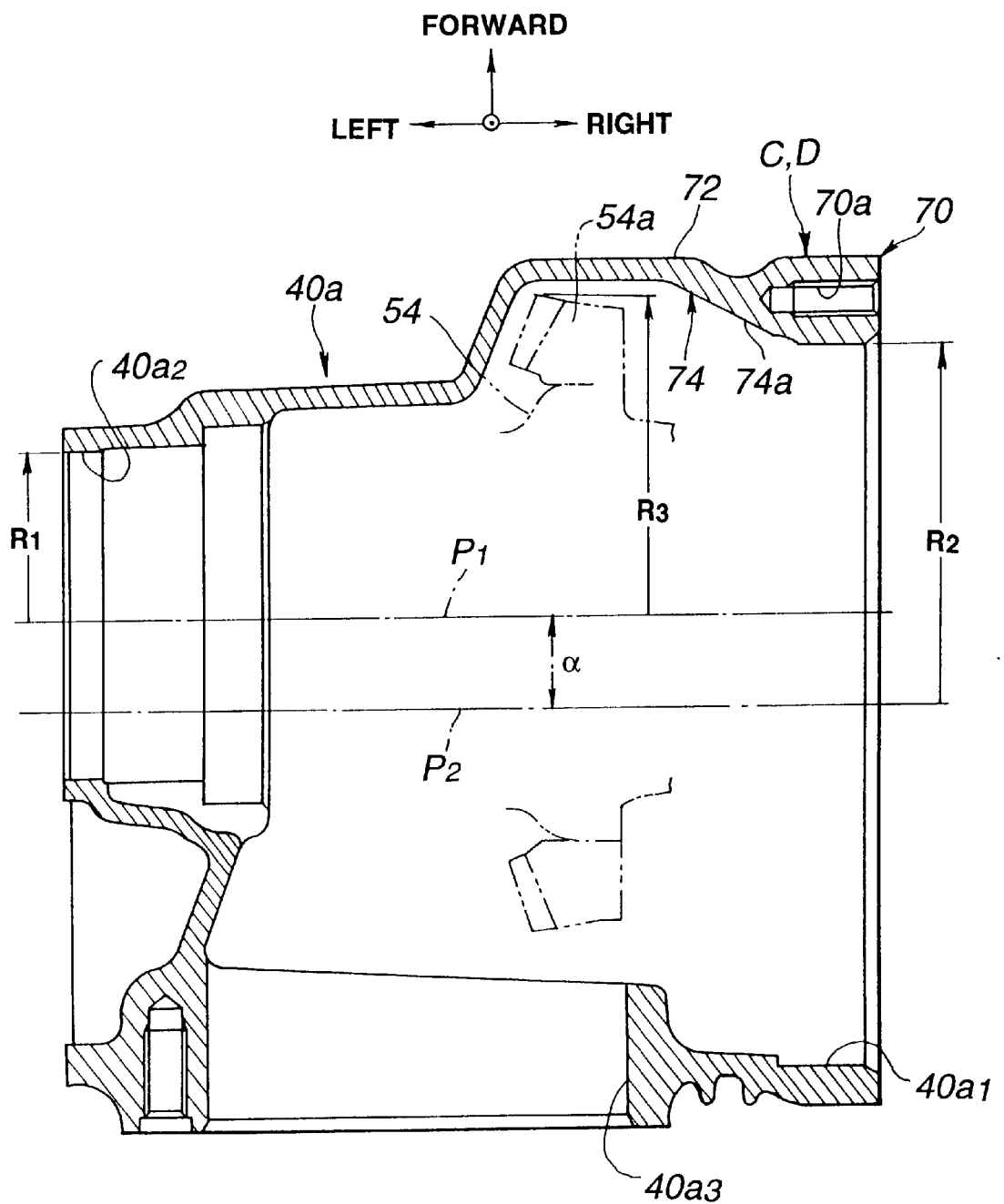
FIG. 3 is a cross sectional view taken on line III—III in FIG. 4 of a case of the driving power transfer apparatus according to the present invention.

The case body 40a of the transfer case 40 is a tubular aluminum alloy molding which is cast by means of the shell mould process. In this shell mould process of the case body 40a, a core is used in order to form a hollow portion of the case body 40a. As shown in FIG. 3, the case body 40a has a first opening $40a_1$ engaged with the adapter 40b, a second opening $40a_2$ connected with the transmission case 26c, and a third opening $40a_3$ formed at a part of the case body 40a. More particularly, the case body is approximately cylindrical in shape and defines the hollow cylindrical portion $40a_4$ for receiving parts of the driving force transfer apparatus 28. The first opening $40a_1$ is formed at an end of the case body 40a, and the second opening $40a_2$ is formed at the other end of the case body 40a. The left side gear shaft 43a and the hollow shaft 52 are inserted in the case body 40 through the second opening $40a_2$. In FIGS. 2 and 3, a reference $P_1$ denotes a rotation axis of the left side gear shaft 43a and the hollow shaft 52 set in the case body 40a. The rotation axis $P_1$ is also a gear axis of the first driving power transfer gear 54 installed coaxially with the hollow shaft 52. The first opening $40a_1$ is a complete round shaped hole having a radius $R_2$. The second opening $40a_2$ is a complete round shaped hole having a radius $R_1$. The radius $R_2$ of the first opening $40a_1$ is greater than the radius $R_1$ of the second opening $40a_2$ ($R_1<R_2$). The radius $R_2$ of the first opening $40a_1$ is formed such that the hypoid gear 54a, which is a thickest portion of the first driving power transfer gear 54 having a radius $R_3$ can be installed in the case body 40a through the first opening 40a1. That is, a relationship R2>R3>R1 is established so that the first driving power transfer gear 54 is inserted into the case body 40a through the first opening $40a_1$.

Figure 4:
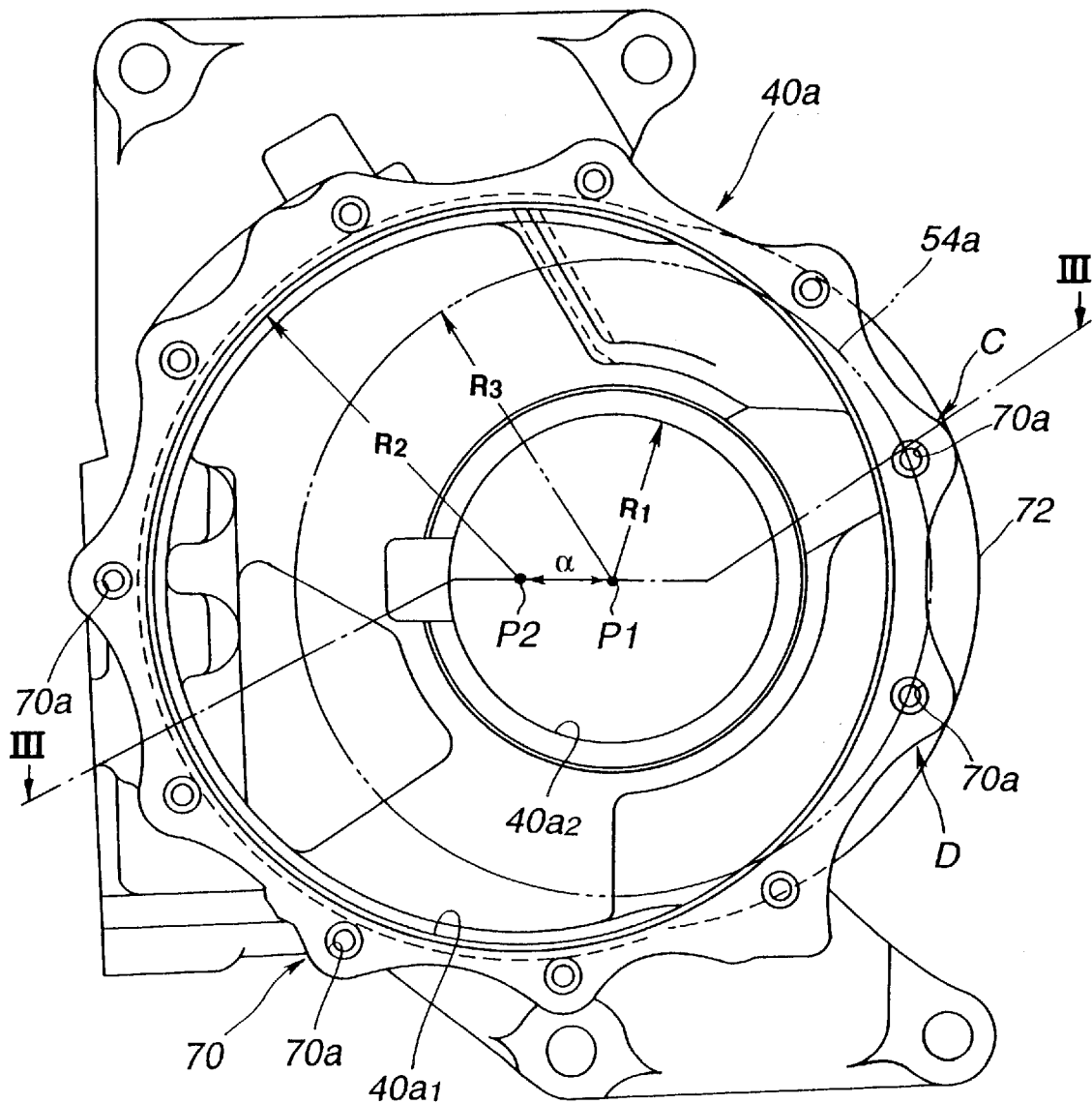
FIG. 4 is a side view of the case of the driving power transfer apparatus according to the present invention.

A plurality of screw holes 70a are formed on a bolt connecting portion 70 formed around the first opening $40a_1$ of the case body 40a at predetermined intervals, as shown in FIG. 4. The case body 40a is secured with the adapter 40b and the side case 40c by screwing a plurality of bolts 41a into the screw holes 70a through holes of the adapter 40b and holes of the side case 40c, respectively.

As shown in FIGS. 3 and 4, a center axis $P_2$ of the first opening $40a_1$ is offset from the gear axis $P_1$ by an offset amount a toward the rearward direction of the vehicle. Accordingly, the peripheral portion of the hypoid gear 54a installed in the case body 40a is overlapped with the bolt connecting portion 70 formed around the first opening $40a_1$ at a forward side thereof as viewed in FIG. 4.

Front parts of the bolt connecting portion 70, which parts are located at a forward side of the vehicle and referenced by C and D in FIGS. 3 and 4, are formed such that the screw holes 70a at the parts C and D are located inside of the case outer surface 72 with respect to the center axis $P_2$. Since the screw holes 70a at the part C and D are formed inside of the case outer surface 72, an undercut portion 72 is formed on an inner surface of the case body 40a. An inner wall surface 74a located near the first opening $40a_1$ of the undercut portion 74 is formed into a truncated cone shaped surface so as to gradually decrease its diameter toward the first opening 40a. The truncated cone shaped inner wall surface 74a is continued with the inner surface of the first opening $40a_1$.

Figure 5:
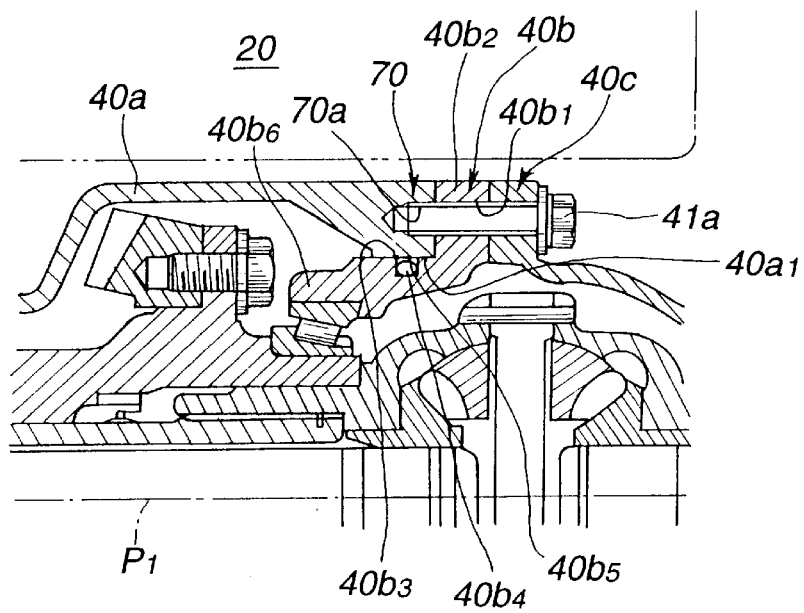
FIG. 5 is a partial cross sectional view taken on line II—II in FIG. 1 which shows a connecting portion between the case and an adapter.

FIG. 5 shows a connecting portion among the case body 40a, the adapter 40b and the side case 40c by means of the bolts 41a. The adapter 40b is provided with an adapter flange portion $40b_2$, a cylindrical engaged portion $40b_3$, and an inner diameter supporting portion $40b_6$. The adapter flange portion $40b_2$ has a plurality of bolt through-holes $40b_1$ corresponding to the screw holes 70a of the bolt connecting portion 70. The cylindrical engaged portion $40b_3$ is continuously formed with the inner diameter portion of the adapter flange portion $40b_2$. The inner diameter supporting portion $40b_6$ is formed at a tip end portion of the cylindrical engaged portion $40b_3$ and rotatably supports the large diameter cylindrical portion 54c of the first driving power transfer gear 54 through the second bearing 57.

A circumferential groove $40b_4$ having a rectangular cross section is formed on the cylindrical engaged portion $40b_3$. An O-ring $40b_5$ is installed in the circumferential groove $40b_4$ so that the inner surface defining the first opening $40a_1$ is sealingly contacted with the engaged surface of the engaged cylindrical portion $40b_3$ thereby.

The operation of the four wheel drive vehicle equipped with the driving power transfer apparatus according to the present invention will be discussed with reference to FIGS. 1 and 2.

The driving torque generated by the engine 20 is transferred to the transmission 26 and is converted into rotation speed. The converted driving torque is transferred from the output shaft 26b of the transmission 26 through the output gear 26d and the input gear 42b to the center differential 42. Further, the driving torque transferred to the center differential 42 is apportioned to the left side gear 42e and the right side gear 42f. The driving torque of the left side gear 42e is transferred to the front differential 46 through the hollow shaft 52. Then, the driving torque is apportioned to the left side gear 46e and the right side gear 46f of the front differential 46 and is transferred to the front wheels 22FL and 22FR as driving force.

The driving torque at the right side gear 42f is transferred to the first driving power transfer gear 54 and the second driving power transfer gear 60. Then, the driving torque transferred to the second driving power transfer gear 60 is transferred to the rear differential 34 through the propeller shaft 32. The driving torque transferred to the rear differential 34 is apportioned to a left side gear (not shown) and a right side gear (not shown) of the rear differential 34. Then, the driving torque is transferred through a rear drive shaft 36 to the rear wheels 22RL and 22RR as driving force.

In case that the rotation speed of the left side gear 42e of the center differential 42 is different from that of the right side gear 42f of the center differential 42, a relative rotation is generated between the inner sleeve 44a and the outer sleeve 44b of the viscous coupling 44. The viscous coupling 44 generates differential limiting torque due to the viscous resistance of the silicon oil in the viscous coupling 44 according to the magnitude of the relative rotation. This differential limiting torque functions to increase the driving force of a lower rotation speed wheel of the front and rear wheels 22FL, 22FR, 22RL and 22RR and to decrease the driving force of a higher rotation speed wheel of the front and rear wheels 22FL, 22FR, 22RL and 22RR. Even if one of the front and rear wheels 22FL, 22FR, 22RL and 22RR slips on a muddy road or icy road, the driving force applied to the other non-slipping wheels is increased so as to properly apportion the driving force to the wheels.

Next, the function of the case body 40a and the adapter 40b of the transfer case 40 will be discussed.

The bolt connecting portion 70 of the case body 40a is formed such that its front portion facing with the engine 20 is located at an inner portion as compared with the outer peripheral surface 72. That is, the bolt connecting portion 70 is located so as to be overlapped with the teeth outer peripheral portion of the hypoid gear 54a in the case body 40a as viewed from the right hand side of FIG. 3. Therefore, the bolt connecting portion 70 is located so as not to project toward the engine 20 as compared with the outer peripheral surface 72. This enables a sufficient clearance to be ensured between the engine 20 and the bolt connecting portion 70.

Further, in case that the engine 20 and the driving force transfer system 24 are installed in a 4WD vehicle employing a transverse engine arrangement, the degree of freedom of a layout in the longitudinal direction (fore-and-aft) is improved.

Since the first opening $40a_1$ functioning as an inserting portion for the first driving power transfer gear 54 is set such that the center axis $P_2$ of the first opening 40a1 is offset from the gear axis $P_1$ by a predetermined offset amount α and that the bolt connecting portion 70 is formed at a peripheral portion of the first opening 40a1, the installation of the first driving power transfer gear 54 into the case body 40a becomes easy. That is, the installation of the first driving power transfer gear 54 is accomplished by inserting the first driving power transfer gear 54 upon offsetting by the offset amount α and by returning the first driving power transfer gear 54 in the case body 40a by the offset amount α.

During the transferring operation between the first and second driving power transfer gears 54 and 60, the hypoid gear 60a of the second driving power transfer gear 60 generates an engagement reaction force with respect to the hypoid gear 54a of the first driving power transfer gear 54 engaged therewith so as to push the first driving power transfer gear 54 toward the right hand side of FIG. 3. By this pushing of the first driving power transfer gear 54, the adapter 40b supporting the first driving power transfer gear 54 receives the pushing force directing toward the right hand side in FIG. 3.

The pushing force applied to the adapter 40b through the inner supporting portion $40b_6$ functions so as to weaken the bolted connection between the flange portion $40b_2$ of the adapter 40b and the bolt connecting portion 70. This may degrade the oil sealing performance. However, the cylindrical engaged portion $40b_3$ of the adapter 40b is fittingly inserted to the first opening $40b_1$ so as to prevent the lubrication oil in the transfer case 40 from leaking through the connecting surfaces, as shown in FIG. 5. Further, an O-ring $40b_5$ is installed in a circumferenctial groove $40b_4$ formed on the cylindrical engaged portion $40b_3$. Therefore, the transfer case 40 securely maintains the oil sealing performance.

Figure 6:
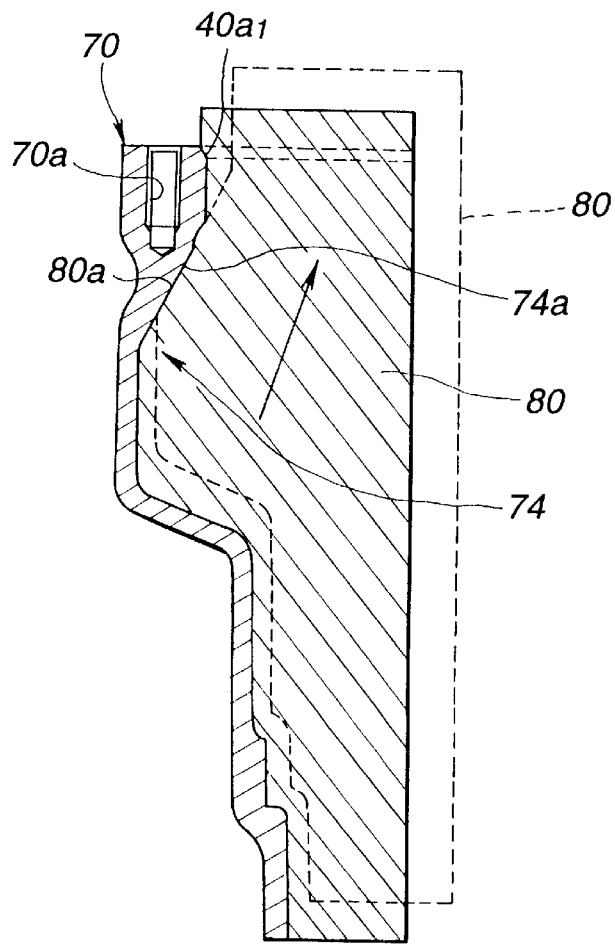
FIG. 6 is a cross sectional view showing a core for casting the case of FIG. 3 by means of the shell mould process.

In order to form a portion of the bolt connecting portion 70 directing to the engine 20, the case body 40a has an undercut portion 74 at its inner surface. The inner wall surface 74a located near the first opening $40a_1$ of the undercut portion 74 is formed into a truncated cone shaped surface so as to gradually decrease its diameter toward the first opening $40a_1$. The truncated cone shaped inner wall surface 74a is continued with the inner surface of the first opening $40a_1$. Therefore, the castability of the case body 40a by means of the shell mould process is improved. In order to cast the case body 40a by means of the shell mould process, a plurality of divided cores are prepared to form the hollow portion of the case body 40a. FIG. 6 shows one core 80 for forming the hollow portion located at the forward portion of the case body 40a. The core 80 has an outer surface 80a of a truncated cone shaped surface corresponding to the inner wall surface 74a of the case body 40a. After the case body 40b is cast, the divided cores, in turn, are detached from the case body 40a. The core 80 facing with the inner wall portion 74a is obliquely drawn as shown in FIG. 6. Therefore, the detaching operation of the cores is smoothly executed.

Although the embodiment according to the present invention has been shown and described as to the transfer case 28 applied to a four wheel drive vehicle equipped with a transverse engine, it will be understood that the present invention is not limited to this and may be applied to other apparatuses and cases thereof in order to ensure a clearance with respect to adjacent apparatus and to further improve the sealing performance of the structural case.

While the embodiment according to the present invention has been shown and described such that the circumferential groove $40b_4$ is formed on the cylindrical engaged portion in the circumferential direction and the O-ring $40b_5$ is installed in the circumferential groove $40b_4$, it will be understood that such circumferential groove may be formed on the inner surface of the first opening $40a_1$ and the O-ring may be installed in the groove of the case body 40a.

Further, the application of the present invention is not limited to the transfer having the structure shown in FIG. 2, and the center differential 42, the viscous coupling 44 and the front differential constituting the driving transfer system 24 may be modified in arrangement.

What is claimed is:

1. A transfer case of a driving power transfer apparatus of an automotive vehicle, the driving power transfer apparatus connected to an engine through a transmission, the transfer case comprising:

a case body formed into a cylindrical shape and having a first opening, a gear being inserted through the first opening in said case body, the first opening having a first radius which is greater than a maximum radius of the gear, a bolt connecting portion being formed around the first opening, the bolt connecting portion being formed such that a part thereof located at a front part for facing the engine is located nearer to an axis of the first opening than a cylindrical shaped wall portion around the gear;

an adapter connected to the bolt connecting portion by bolts, said adapter having a cylindrical engaged portion which is sealingly engaged with a wall defining the first opening of said case body; and a side case connected to the bolt connecting portion through said adapter by the bolts.

2. A transfer case as claimed in claim 1, wherein said adapter has a gear supporting portion which rotatably supports the gear through a bearing.

3. A transfer case as claimed in claim 1, wherein said adapter has a circumferential groove on the cylindrical engaged portion, an O-ring being installed in the circumferential groove.

4. A transfer case as claimed in claim 1, wherein said case body further has a second opening formed opposite to the first opening and a third opening formed on a cylindrical surface of said case body such that an axis of the third opening is perpendicular to that of the second opening.

5. A transfer case of a driving power transfer apparatus of an automotive vehicle, the driving power transfer apparatus connected to an engine through a transmission, the transfer case comprising:

a case body including a first opening formed at an end of the case body, a second opening formed at the other end of the case body, and a bolt connecting portion formed around the first opening, the first opening being formed such that a radius thereof is greater than a maximum radius of a gear installed in the case body, a center axis of the first opening being offset from a center axis of the gear installed in the case body by a predetermined offset amount so that a front part of the bolt connecting portion for facing the engine is farther apart from the engine than a cylindrical portion of the case body; and an adapter connected to the bolt connecting portion by bolts, said adapter having a cylindrical engaged portion which is sealingly engaged with the first opening.

6. A transfer case of a driving power transfer apparatus of an automotive vehicle, the driving power transfer apparatus connected to an engine through a transmission, the transfer case comprising:

a case body including a first opening formed at an end of the case body and a bolt connecting portion formed around the first opening, the first opening being offset such that a part of the bolt connecting portion is overlapped with a cylindrical portion of the case body as viewed from the axis of the first opening; and an adapter connected to the bolt connecting portion by bolts, said adapter having a cylindrical engaged portion which is sealingly engaged with the first opening of said case body.

7. A transfer case as claimed in claim 6, wherein the first opening has a radius which is greater than that of a maximum radius portion of a gear installed in the case body, a center of the first opening being offset from a center of the gear by a predetermined offset amount.

8. A transfer case as claimed in claim 6, wherein said adapter rotatably supports a gear installed in the case body while restricting movement in a thrusting direction.

9. A transfer case as claimed in claim 6, wherein the first opening is formed into a round hole, the cylindrical engaged portion of said adapter is formed circular in cross section, and an O-ring is installed between the first opening of said case body and the cylindrical engaged portion of said adapter.

10. A transfer case as claimed in claim 6, wherein a circumferential groove for installing an O-ring is formed on one of an inner surface of the first opening and the cylindrical engaged portion of said adapter.

11. A transfer case as claimed in claim 6, wherein an undercut portion is form on an inner surface of a cylindrical portion of the case body due to the overlap of the bolt connecting portion to provide a truncated cone shaped surface.

* * * * *